United States Patent
Shi

(10) Patent No.: US 12,509,165 B2
(45) Date of Patent: Dec. 30, 2025

(54) INSTALLING FLAT WALL PANELS ON NON-FLAT INNER WALLS OF A VEHICLE

(71) Applicant: Absolute Health & Performance, Inc., Austin, TX (US)

(72) Inventor: Roy Ruijia Shi, Austin, TX (US)

(73) Assignee: Absolute Health & Performance, Inc., Austin, TX (US)

(*) Notice: Subject to any disclaimer, the term of this patent is extended or adjusted under 35 U.S.C. 154(b) by 282 days.

(21) Appl. No.: 18/171,098

(22) Filed: Feb. 17, 2023

(65) Prior Publication Data

US 2024/0217594 A1 Jul. 4, 2024

Related U.S. Application Data

(60) Provisional application No. 63/477,485, filed on Dec. 28, 2022.

(51) Int. Cl.
*B62D 33/04* (2006.01)
*F16B 5/02* (2006.01)

(52) U.S. Cl.
CPC .......... *B62D 33/046* (2013.01); *F16B 5/0208* (2013.01)

(58) Field of Classification Search
CPC ...... B62D 33/046; F16B 5/0208; F16B 37/08; F16B 37/0807; Y10T 29/49947; Y10T 29/49948; Y10T 29/49954; Y10T 29/49956; Y10T 29/49963

USPC .............. 29/525.01, 525.02, 525.05, 525.06, 29/525.11; 411/546; 427/436; 296/39.1, 296/214

See application file for complete search history.

(56) References Cited

U.S. PATENT DOCUMENTS

| | | | | |
|---|---|---|---|---|
| 5,094,622 A | * | 3/1992 | Auclair | H01R 4/64 439/94 |
| 6,669,422 B1 | * | 12/2003 | Sterle | F16B 5/0233 411/546 |
| 6,860,686 B2 | * | 3/2005 | Schneider | F16B 35/048 411/546 |
| 7,559,736 B1 | * | 7/2009 | Mohan | B60P 1/027 280/43.11 |
| D662,805 S | * | 7/2012 | Macdonald | D8/373 |
| 2013/0034409 A1 | * | 2/2013 | Haworth | F16B 43/009 411/546 |
| 2015/0143673 A1 | * | 5/2015 | Biadatz | B61D 17/18 24/458 |
| 2019/0219081 A1 | * | 7/2019 | Hagedorn | F16B 37/14 |

* cited by examiner

*Primary Examiner* — Sarang Afzali
*Assistant Examiner* — Darrell C Ford
(74) *Attorney, Agent, or Firm* — KLEMCHUK PLLC

(57) ABSTRACT

Methods for installing a flat wall panel on a non-flat inner wall of a vehicle can include coupling spacers to the inner wall of the vehicle such that a length of the spacers is equal to a Z-distance that is measured as the distance between a surface where the spacer is mounted and a plane where the flat wall panel is to be placed in the vehicle.

10 Claims, 6 Drawing Sheets

INSTALLING FLAT WALL PANELS ON NON-FLAT INNER WALLS OF A VEHICLE

CROSS-REFERENCE TO RELATED APPLICATIONS

This non-provisional application claims the benefit of, and priority to, U.S. Provisional Application No. 63/477,485, entitled INSTALLING FLAT WALL PANELS ON NON-FLAT INNER WALLS OF A VEHICLE, filed on Dec. 28, 2022, which is incorporated by reference in its entirety.

FIELD OF THE DISCLOSURE

The present disclosure generally relates to vehicle customization, and more particularly, to installing flat wall panels on the inside of a vehicle.

BACKGROUND

Mobile service and product providers can utilize a vehicle to provide the mobile service or product. Examples of these vehicles are food trucks and mobile medical vehicles. The interior of the vehicle can be customized for the particular use. However, the inner walls of the vehicle can have a curvature that is not flat, which hinders customization of the inside of the vehicle for the mobile service or product provider.

Many wall panels follow the curvature of the inner walls of the vehicle. One solution to create a flat wall inside a vehicle having non-flat inner walls is to use gridded system of beams, on which flat wall panels can be mounted. The gridded system has to be measured, engineered, and installed around the configuration of the non-flat inner walls of the vehicle. The gridded system of beams is typically a slow and costly technique to customize a vehicle for a particular mobile service or product provider.

There is a need for a faster creation of flat walls inside a vehicle having non-flat inner walls.

SUMMARY

A method for installing a flat wall panel on a non-flat inner wall of a vehicle can include: attaching a first slotted body rivet nut to the non-flat inner wall of the vehicle such that a longitudinal axis of the first slotted body rivet nut extends parallel to a floor of the vehicle; attaching a first spacer to the first slotted body rivet nut, wherein the first spacer has a first bolt passage formed therein, wherein a longitudinal axis of the first bolt passage is aligned with the longitudinal axis of the first slotted body rivet nut; aligning a first bolt hole formed in the flat wall panel with the first bolt passage formed in the first spacer; inserting a first bolt through the first bolt hole of the flat wall panel, through the first bolt passage of the first spacer, and into an end of the first slotted body rivet nut; and tightening the first bolt into the first slotted body rivet nut.

A method for creating a flat plane and installing a flat wall panel on a non-flat inner wall of a vehicle can include: determining a plane in the vehicle for placement of the flat wall panel; attaching a first slotted body rivet nut to the non-flat inner wall of the vehicle such that a longitudinal axis of the first slotted body rivet nut extends parallel to a floor of the vehicle; determining a Z-distance between an abutment surface of the first slotted body rivet nut and the plane; and attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut, wherein a length of the first spacer is equal to the Z-distance.

Other technical features may be readily apparent to one skilled in the art from the following figures, descriptions and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

"Z-distance" as used herein refers to a horizontal distance between two reference points as disclosed herein, where the distance is parallel to the floor of a vehicle. Z-distance corresponds to a distance in a Z-direction, as opposed to an X-direction or a Y-direction. X-direction, Y-direction, and Z-direction are defined in the description for FIG. 1.

Disclosed are methods of installing flat wall panels on a non-flat inner wall of a vehicle. The methods can include coupling spacers to the inner wall of the vehicle such that a length of the spacers is equal to a Z-distance that is measured as the distance between a surface where the spacer is mounted and a plane where the flat wall panel is to be placed in the vehicle. The methods make installation of flat wall panels in a vehicle easier, such that one person can install the flat wall panels. Thus, not only is installation time reduced with the disclosed installation methods, so is the amount of labor required for the installation.

The methods are described herein with reference to a van as the vehicle; however, it should be understood that the method can be implemented in any vehicle having non-flat inner walls, regardless whether the vehicle is called a van or not.

Figure 1:
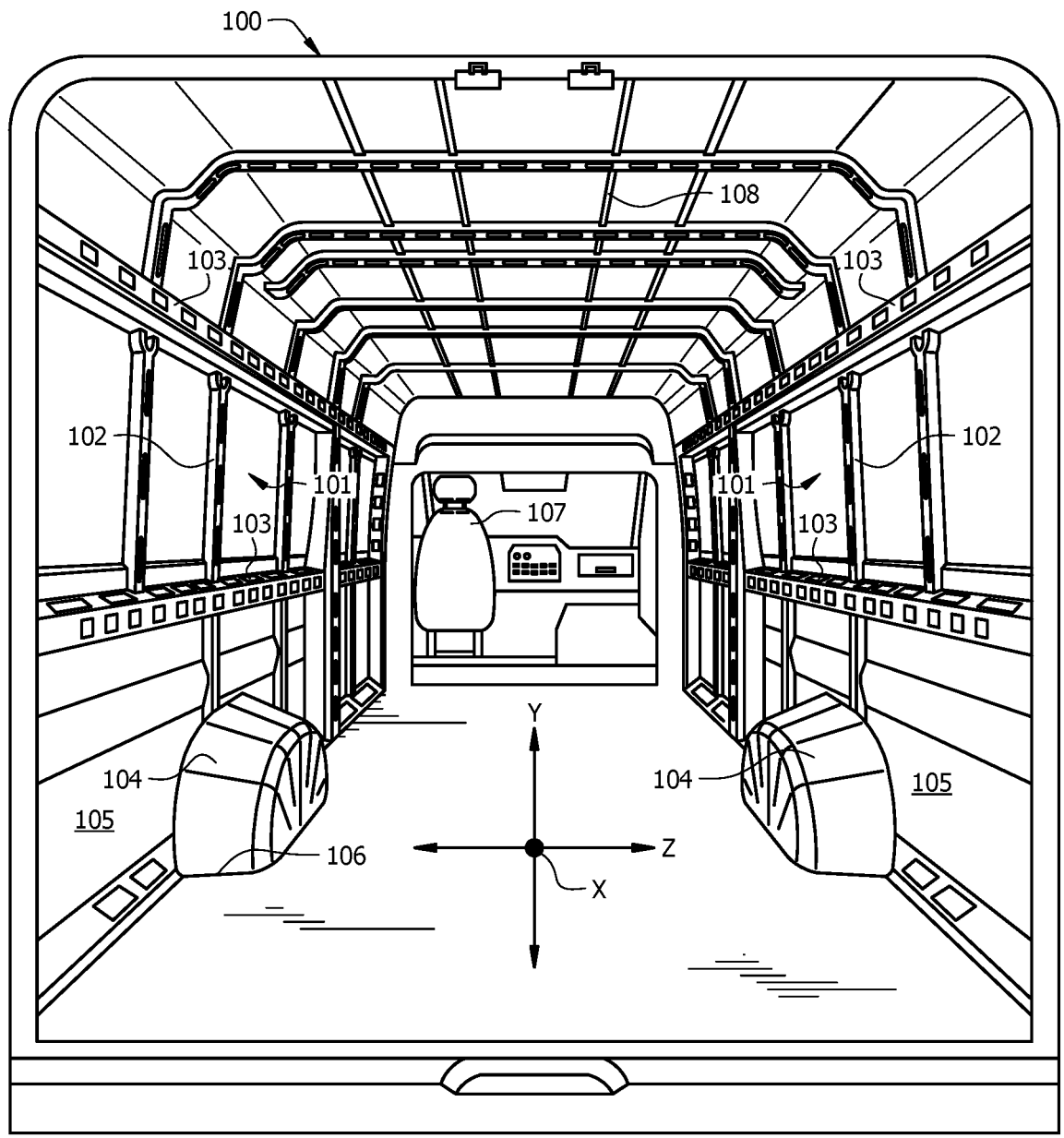
FIG. 1 illustrates a back elevational view of the inside of a van.

FIG. 1 illustrates a back elevational view of the inside of a van 100. The van 100 has non-flat inner walls 101. Each non-flat inner wall 101 has vertical support members 102 and horizontal support members 103 attached to the sheet metal 105. The sheet metal 105 defines the outer shape of the van 100. Each of the non-flat inner walls 101 extends generally vertically upwardly from a floor 106 of the van 100 to the ceiling 108 of the van 100. Wheel wells 104 can be seen extending upwardly from the floor 106. The driver seat 107 can be seen in the front of the van 100.

An axes legend is included in FIG. 1 to give reference to the directions discussed herein. The axes legend has an X-axis, a Y-axis, and a Z-axis. The X-axis extends in an X-direction out of and into the page that illustrates FIG. 1 and is horizontal to the floor 106 of the van 100. The Y-axis extends in a Y-direction that is vertical in FIG. 1 and perpendicular to the floor 106 of the van 100. The Z-axis extends in a Z-direction that is horizontal in FIG. 1 and parallel to the floor 106 of the van 100. The Z-axis can extend in any X-Y plane inside the van 100.

Figure 2:
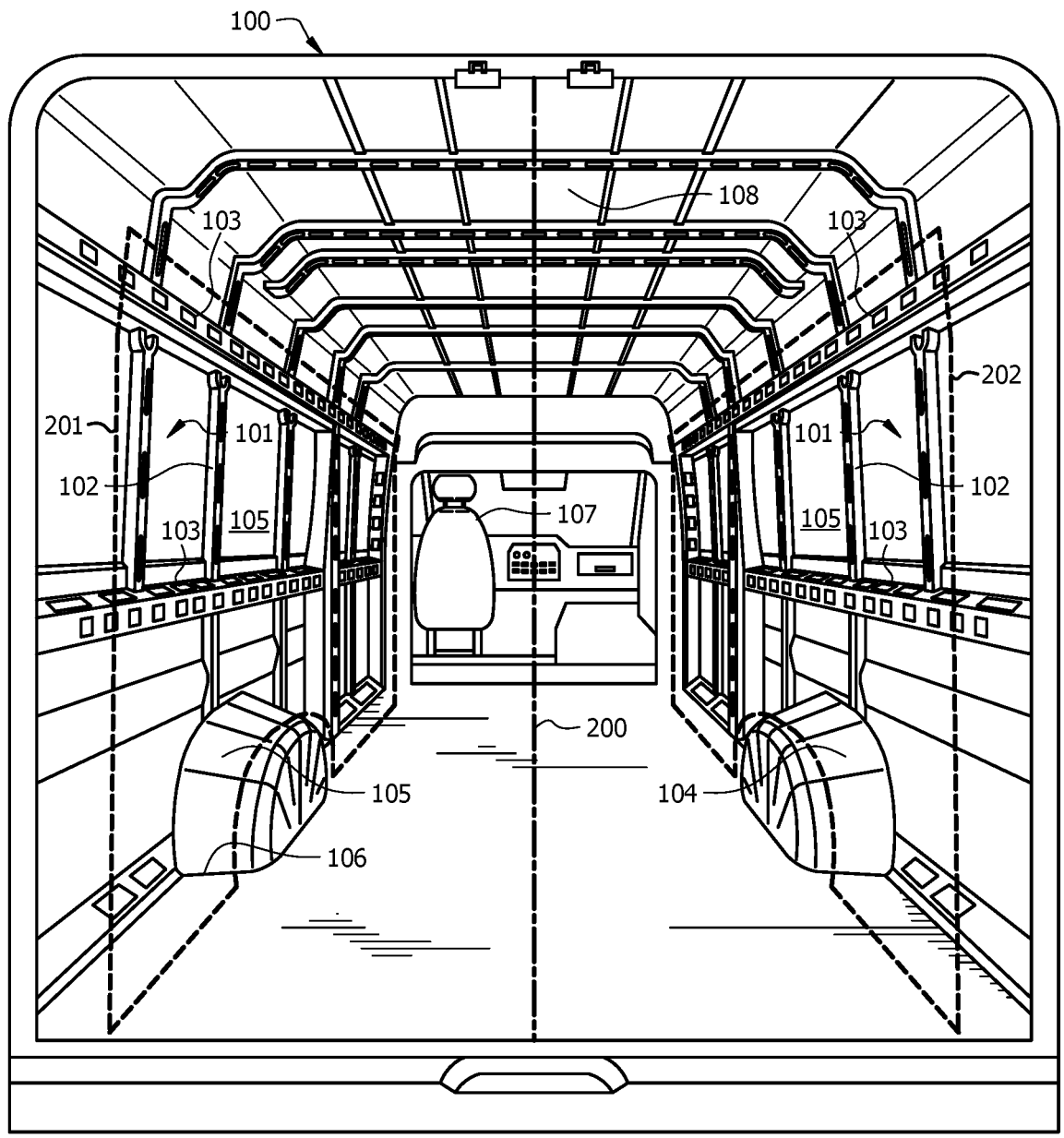
FIG. 2 illustrates the back elevational view of FIG. 1, with planes drawn where flat wall panels can be placed.

FIG. 2 illustrates the back elevational view of FIG. 1, with planes 201 and 202 drawn where flat wall panels can be placed inside the van 100. A central plane 200 in the center of the width of the van 100 can be seen. Each plane 201 and 202 is the same distance from the central plane 200; however, other configurations include planes having a different distance from the central plane 200, depending on the desired configuration of the flat wall panels.

The disclosed method can include determining a plane 201 or 202 in the van 100 for placement of a flat wall panel. The plane 201 or 202 generally extends in the X-direction and the Y-direction of the vehicle. The flat wall panel can be any size and placed along the plane 201 or 202, and the illustration of the planes 201 and 202 in FIG. 2 are not intended to define the size and shape of the flat wall panel(s) that may be installed inside the van 100.

Figure 3:
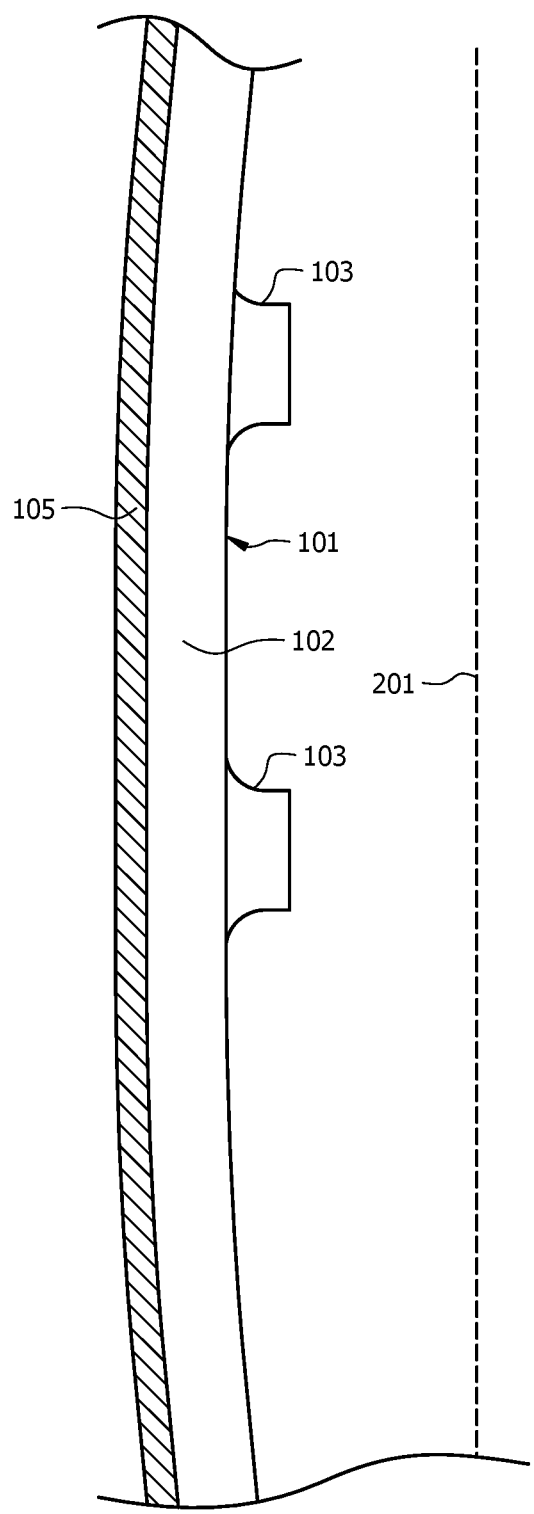
FIG. 3 illustrates an isolated elevational view of a non-flat inner wall of the van in FIG. 1 with the plane where a flat wall panel can be placed.

FIG. 3 illustrates an isolated elevational view of a non-flat inner wall 101 of the van 100 in FIG. 1 with the plane 201 where a flat wall panel can be placed. The non-flat inner wall 101 can be seen as including the sheet metal 105, a vertical support member 102 attached to the sheet metal 105, and horizontal support members 103 attached to the vertical support member 102. As can be seen, the plane 201 is spaced apart from the non-flat inner wall 101. The location of the plane 201 has been determined as described for FIG. 2.

Figure 4:
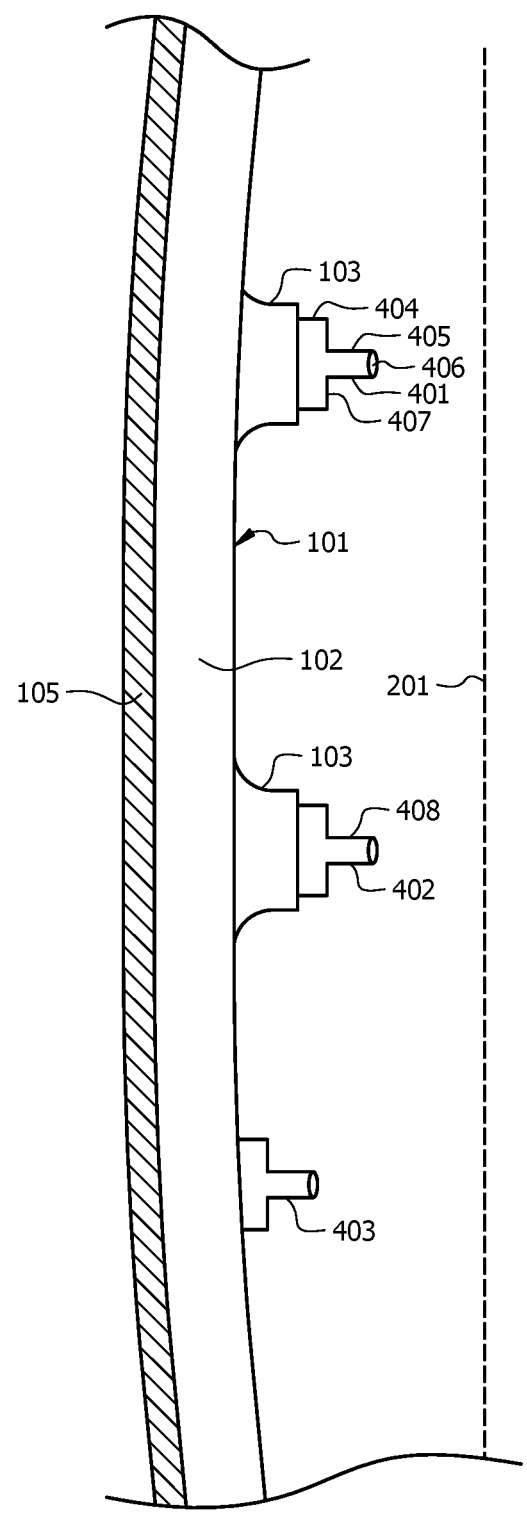
FIG. 4 illustrates the isolated perspective view of the non-flat inner wall in FIG. 3, with slotted body rivet nuts mounted thereon.

FIG. 4 illustrates the isolated perspective view of the left-side non-flat inner wall 101 in FIG. 3, with slotted body rivet nuts 401, 402, and 403 mounted thereon. Each of slotted body rivet nuts 402 and 403 has the same configuration as slotted body rivet nut 401. slotted body rivet nut 401 has a base 404, a shaft 405 connected to the base 404, and a threaded hole 406 extending inside the shaft 405. In aspects, the threaded holed 406 can extend at least partially into the base 404. The base 404 can have any shape such as a circular shape, a polygonal shape, or a plus shape. The shaft 405 can have the shape of a hollow cylinder. A diameter of the shaft 405 can be less than a diameter of the base 404 such that an abutment surface 407 is formed on the slotted body rivet nut 401. The abutment surface 407 can be configured to abut or contact the spacers that are described in FIG. 5.

The disclosed method can include attaching a slotted body rivet nut 401, 402, 403 to the non-flat inner wall 101 of the van 100 such that a longitudinal axis of the slotted body rivet nut 401, 402, 403 extends parallel to the floor 106 of the van 100. As can be seen, the plane 201 is spaced apart from the slotted body rivet nuts 401, 402, and 403. The slotted body rivet nut 401, 402, 403 can be attached to the non-flat inner wall 101 via any technique such as welds or adhesive.

Figure 5:
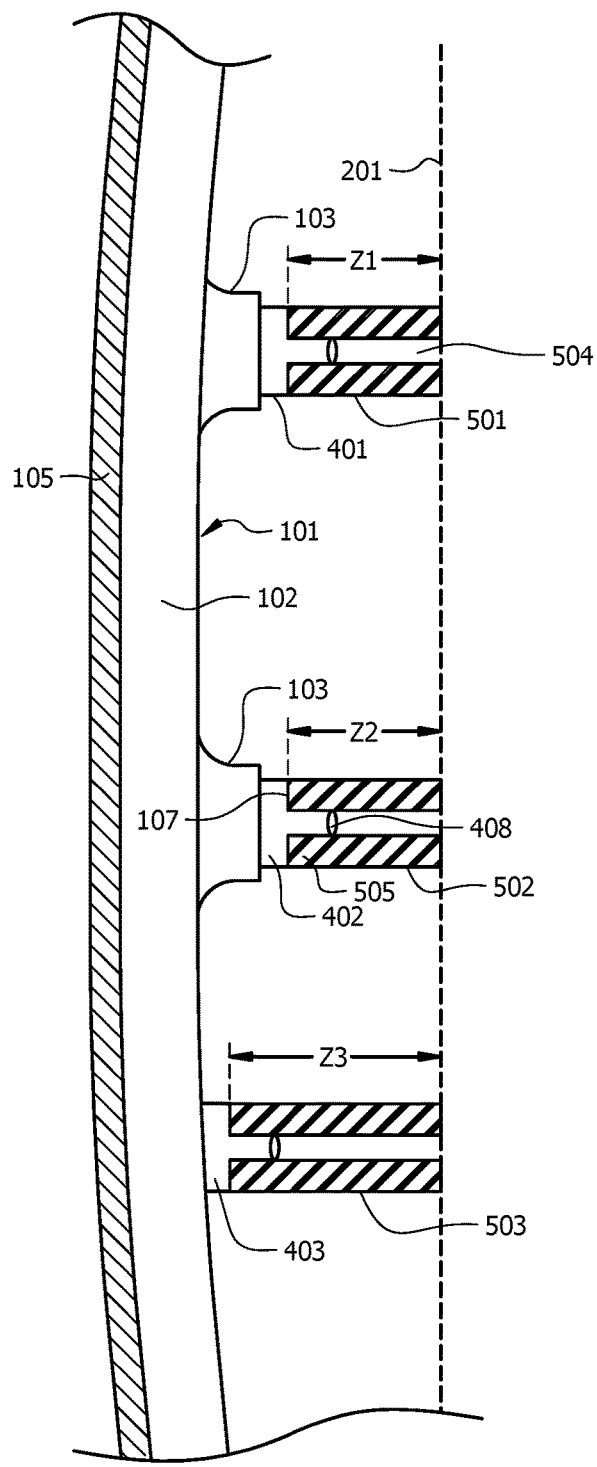
FIG. 5 illustrates the isolated perspective view of the non-flat inner wall in FIG. 4, with spacers mounted on the slotted body rivet nuts.

FIG. 5 illustrates the isolated perspective view of the non-flat inner wall 101 in FIG. 4, with spacers 501, 502, and 503 mounted on the slotted body rivet nuts 401, 402, and 403, respectively.

The disclosed method can include attaching the spacer 501, 502, 503 to the slotted body rivet nut 401, 402, 403. Each spacer 501, 502, 503 has a bolt passage 504 formed therein. A longitudinal axis of the bolt passage 504 of each spacer 501, 502, 503 is aligned with the longitudinal axis of the respective slotted body rivet nut 401, 402, 403. In aspects, an end 408 of the slotted body rivet nut 401, 402, 403 can extend into the bolt passage 504 of the respective spacer 501, 502, 503. In FIG. 5, an end 505 of each spacer 501, 502, 503 can be seen attached to the abutment surface 407 of the respective slotted body rivet nut 401, 402, 403. In some aspects, an outer diameter of the end 408 of the slotted body rivet nut 401, 402, 403 can be equal to or less than a diameter of the bolt passage 504 in the respective spacer 501, 502, 503. The spacer 501, 502, 503 can be attached to the slotted body rivet nut 401, 402, 403 via any technique such as by adhesive.

The disclosed method can include determining a Z-distance $Z1$, $Z2$, $Z3$ between the abutment surface 407 of the slotted body rivet nut 401, 402, 403 and the plane 201. The Z-distances $Z1$, $Z2$, and $Z3$ in FIG. 5 can each be any value. The Z-distance $Z1$ is not equal to Z-distance $Z2$ or Z-distance $Z-3$, and Z-distance $Z2$ is not equal to Z-distance $Z3$. When using multiple slotted body rivet nut and spacer assemblies, there can be any number and combination of Z-distances for the slotted body rivet nut and spacer assemblies for a non-flat inner wall 101. Each slotted body rivet nut and spacer assembly has a Z-distance such that each spacer extends to the plane 201, and only to plane 201, such that a flat wall panel can be mounted to a collection of slotted body rivet nut and spacer assemblies that all extend to the plane 201.

In aspects, a length of the spacer 501 can be equal to the Z-distance $Z1$, a length of the spacer 502 can be equal to the Z-distance $Z2$, a length of the spacer 503 can be equal to the Z-distance $Z3$, or combinations thereof. In some aspects, a length of the bolt passage 504 of spacer 501 can be equal to the Z-distance $Z1$, a length of the bolt passage 504 of spacer 502 can be equal to the Z-distance $Z2$, a length of the bolt passage 504 of spacer 503 can be equal to the Z-distance $Z3$, or combinations thereof.

In aspects, the spacers 501, 502, and 503 can be formed of a polymer such as polyethylene or polypropylene. In some aspects, the method can include 3D printing spacers 501, 502, 503, where each spacer 501, 502, 503 is 3D printed with a corresponding Z-distance $Z1$, $Z2$, $Z3$ such that each spacer extends to the plane 201 when mounted to the respective slotted body rivet nut 401, 402, 403.

In aspects, the spacers 501, 502, 503 can have any cross sectional shape such as circular, oval, or polygonal. In these aspects, the bolt passage 504 of each spacer 501, 502, 503 can have a circular or polygonal cross section configured to receive a bolt therein.

In aspects, the diameter of the bolt passage 504 of each spacer 501, 502, 503 is equal to or greater than the diameter of a bolt that is placed in the bolt passage 504.

Figure 6:
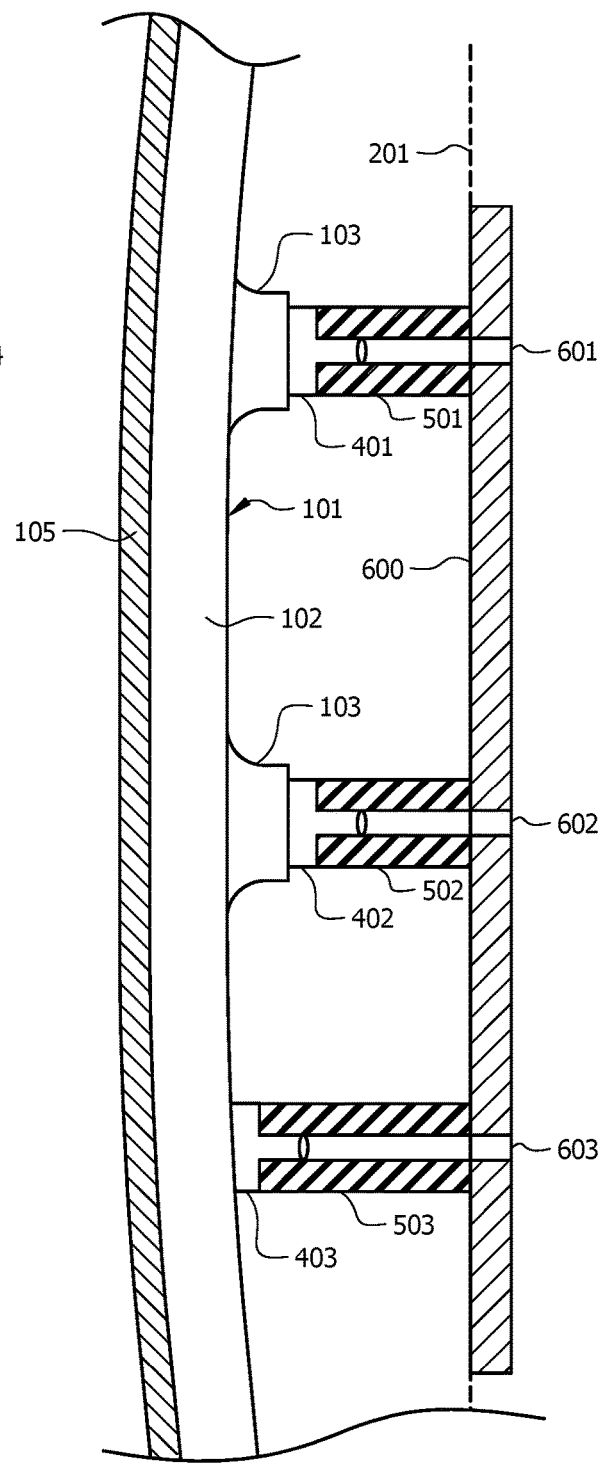
FIG. 6 illustrates the isolated perspective view of the non-flat inner wall in FIG. 5, with bolt holes formed in a flat wall panel that is aligned with the bolt passages in the spacers.

FIG. 6 illustrates the isolated perspective view of the non-flat inner wall 101 in FIG. 5, with bolt holes 601, 602, 603 formed in a flat wall panel 600 that is aligned with the bolt passages 504 in the spacers 501, 502, 503. The flat wall panel 600 can be formed of any material suitable for an inner wall of a vehicle such as metal or polymer.

The disclosed method can include forming bolt holes 601, 602, 603 in the flat wall panel 600 in locations in the plane 201 that correspond to the bolt passages 504 of the spacers 501, 502, 503. The diameter of the bolt holes 601, 602, 603 can be equal to or greater than the diameter of the bolt that is inserted through the corresponding bolt hole 601, 602, 603 in the flat wall panel 600. A longitudinal axis of each bolt hole 601, 602, 603 is the same as the longitudinal axis of the bolt passage 504 of each corresponding spacer 501, 502, 503, which is the same as the longitudinal axis of each corresponding slotted body rivet nut 401, 402, 403.

The disclosed method can include aligning the bolt holes formed in the flat wall panel with the bolt passages of the spacers. In FIG. 6, the method can include aligning the bolt hole 601 formed in the flat wall panel 600 with the bolt passage 504 formed in the first spacer 501, aligning the bolt hole 602 formed in the flat wall panel 600 with the bolt passage 504 formed in the first spacer 502, and aligning the bolt hole 603 formed in the flat wall panel 600 with the bolt passage 504 formed in the first spacer 503.

Figure 7:
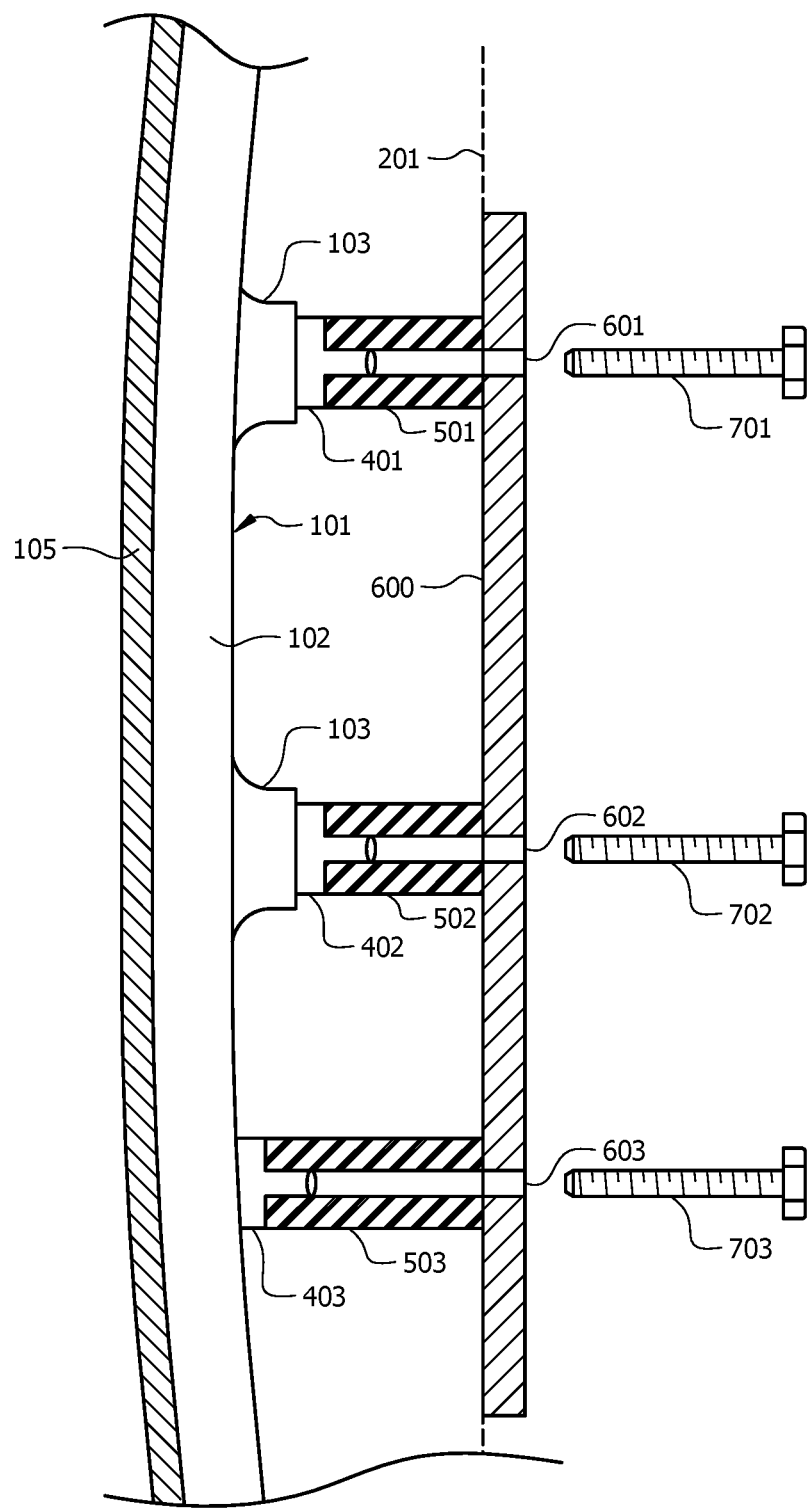
FIG. 7 illustrates the isolated perspective view of the non-flat inner wall in FIG. 6, with bolts aligned with the bolt holes in the wall panel.

FIG. 7 illustrates the isolated perspective view of the non-flat inner wall 101 in FIG. 6, with bolts 701, 702, 703 aligned with the holes 601, 602, 603 in the flat wall panel 600.

The disclosed method can include inserting a bolt through a bolt hole of the flat wall panel, through the bolt passage of the corresponding spacer, and into an end of the corresponding slotted body rivet nut. In FIG. 7, the method includes inserting a bolt 701 through the bolt hole 601 of the flat wall panel 600, through the bolt passage 504 of the spacer 501, and into an end 408 of the slotted body rivet nut 401; inserting a bolt 702 through the bolt hole 602 of the flat wall panel 600, through the bolt passage 504 of the spacer 502, and into an end 408 of the slotted body rivet nut 402; and inserting a bolt 703 through the bolt hole 603 of the flat wall panel 600, through the bolt passage 504 of the spacer 503, and into an end 408 of the slotted body rivet nut 403.

In aspects, a diameter of the bolt 701, 702, 703 is configured to fit within the holes 601, 602, 603 of the flat wall panel 600, within the bolt passage 504 of the corresponding spacer 501, 502, 503, and into the shaft 405 of each corresponding slotted body rivet nut 401, 402, 403. In aspects, a length of the bolt 701, 702, 702 is equal to or greater than the corresponding Z-distance Z1, Z2, Z3 of the corresponding spacer 501, 502, 503.

The disclosed method can include tightening the bolt 701, 702, 703 into the corresponding slotted body rivet nut 401, 402, 403.

In aspects, washers can be used between the spacers 501, 502, 503 and the flat wall panel 600, between the head of the bolts 701, 702, 703 and the flat wall panel 600, or both.

In aspects of the methods, bolts 701, 702, and 703 can be inserted through the bolt passage 504 of the spacers 501, 502, 503, and into the end 408 of the slotted body rivet nuts 401, 402, 403, to hold the spacers 501, 502, 503 while attaching the spacers 501, 502, 503 to the slotted body rivet nuts 401, 402, 403. After the spacers 501, 502, 503 are attached to the slotted body rivet nuts 401, 402, 403, the bolts 701, 702, 703 can be removed for installation of the flat wall panel 600 with bolts 701, 702, 703 as described hereinabove.

Figure 8A:
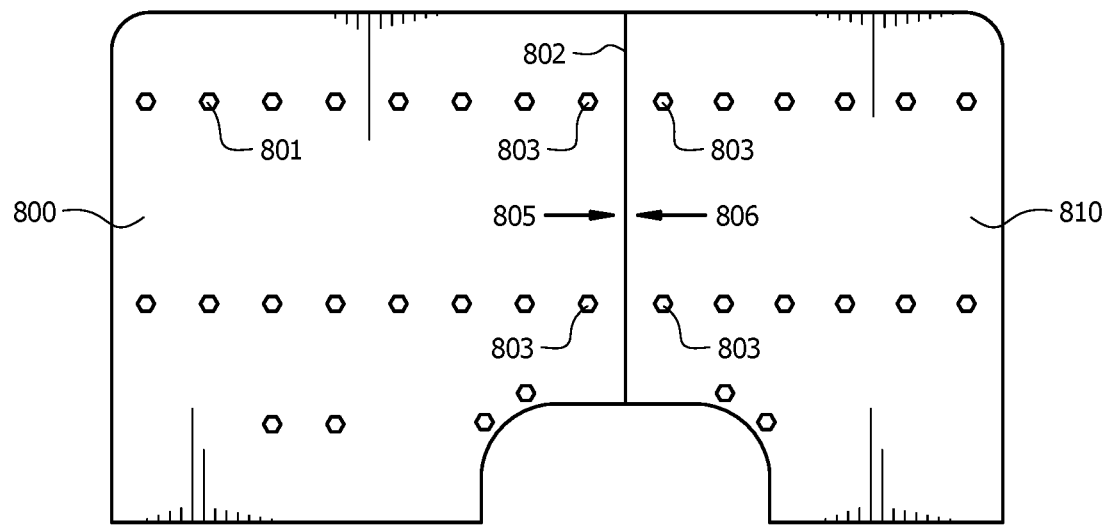
FIG. 8A illustrates a side view of two adjacent flat wall panels having a pattern of bolts attached that corresponds to the locations of the spacers on the non-flat inner wall of the van.

FIG. 8A illustrates a side view of two adjacent flat wall panels 800 and 810 having a pattern of bolts 803 attached that corresponds to the locations of the spacers that are installed on the non-flat inner wall of a vehicle. Edge 805 of the flat wall panel 800 is adjacent to the edge 806 of the flat wall panel 810, forming a seam 802.

The disclosed method described with reference to FIGS. 1 to 7 can be performed for any number of slotted body rivet nut-spacer-bolt assemblies for any corresponding number of holes in a flat wall panel. For example, when the method is performed for a first slotted body rivet nut, a first spacer, and a first bolt, the method can further include attaching a second slotted body rivet nut to the non-flat inner wall of the vehicle such that a longitudinal axis of the second slotted body rivet nut extends parallel to the floor of the vehicle; attaching a second spacer to the second slotted body rivet nut, wherein the second spacer has a second bolt passage formed therein, wherein a longitudinal axis of the second bolt passage is aligned with the longitudinal axis of the second slotted body rivet nut; aligning a second bolt hole formed in a second flat wall panel with the second bolt passage formed in the second spacer; inserting a second bolt through the second bolt hole of the second flat wall panel, through the second bolt passage of the second spacer, and into an end of the second slotted body rivet nut; and tightening the second bolt into the second slotted body rivet nut, wherein an edge of the first flat wall panel is adjacent an edge of the second flat wall panel to form a seam between the first flat wall panel and the second flat wall panel.

Figure 8B:
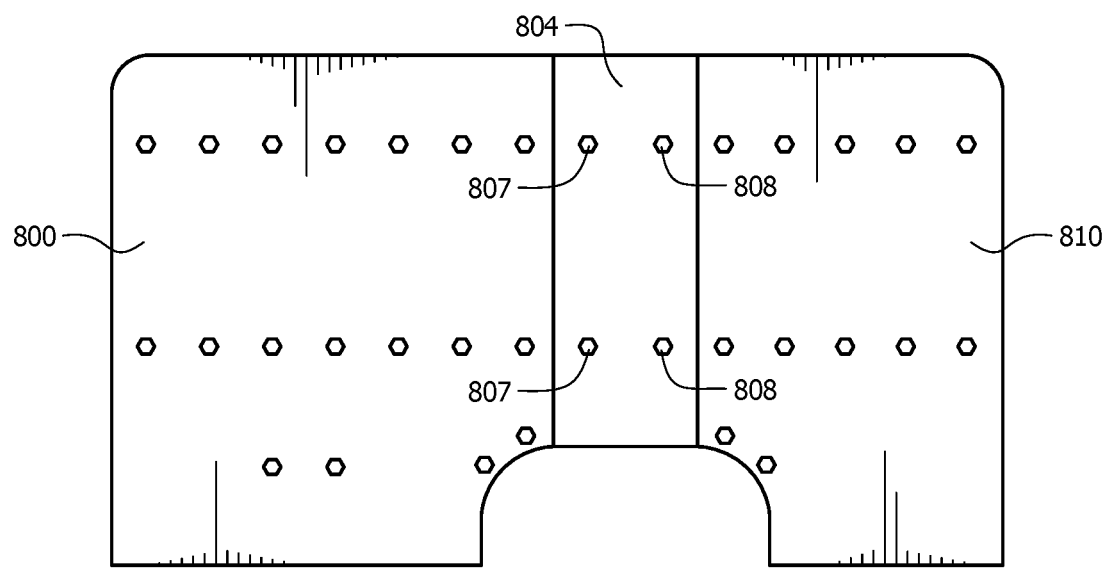
FIG. 8B illustrates a side view of the two adjacent flat wall panels with a flat trim panel placed over the seam of the two adjacent flat wall panels.

FIG. 8B illustrates a side view of the two adjacent flat wall panels with a flat trim panel 804 placed over the seam 802 of the two adjacent flat wall panels 800 and 810.

To install the flat trim panel 804 over the seam 802, the disclosed method can include removing one or more bolts 807 that will be used to secure the flat trim panel 804 from the first flat wall panel 800; removing bolts 808 that will be used to secure the flat trim panel 804 from the second flat wall panel 810; placing a flat trim panel 804 over the seam 802; inserting the one or more bolts 807 through the bolt holes of the first flat wall panel 800, through the first bolt passages of the corresponding spacers, and into the end of the corresponding slotted body rivet nut; retightening the bolts 807 into the corresponding slotted body rivet nuts; inserting the one or more bolts 808 through the bolt hole of the second flat wall panel 810, through the second bolt passages of the corresponding spacers, and into the end of the corresponding slotted body rivet nut; and retightening the bolts 808 into the corresponding slotted body rivet nuts. The method can also include forming bolt holes in the flat trim panel 804 in locations that correspond to the locations of bolt holes in the first flat wall panel 800 and that correspond to the locations of bolt holes in the second flat wall panel 810.

Aspects

Aspect 1. A method for installing a flat wall panel on a non-flat inner wall of a vehicle, the method comprising: attaching a first slotted body rivet nut to the non-flat inner wall of the vehicle such that a longitudinal axis of the first slotted body rivet nut extends parallel to a floor of the vehicle; attaching a first spacer to the first slotted body rivet nut, wherein the first spacer has a first bolt passage formed therein, wherein a longitudinal axis of the first bolt passage is aligned with the longitudinal axis of the first slotted body rivet nut; aligning a first bolt hole formed in the flat wall panel with the first bolt passage formed in the first spacer; inserting a first bolt through the first bolt hole of the flat wall panel, through the first bolt passage of the first spacer, and into an end of the first slotted body rivet nut; and tightening the first bolt into the first slotted body rivet nut.

Aspect 2. The method of Aspect 1, further comprising: determining a plane in the vehicle for placement of the flat wall panel; and determining a Z-distance between an abutment surface of the first slotted body rivet nut and the plane, wherein a length of the first spacer is equal to the Z-distance.

Aspect 3. The method of Aspect 2, wherein the first spacer is attached to the abutment surface of the first slotted body rivet nut.

Aspect 4. The method of Aspect 2 or 3, wherein a length of the first bolt passage is equal to the Z-distance.

Aspect 5. The method of any of Aspects 2 to 4, wherein a length of the first bolt is equal to or greater than the Z-distance.

Aspect 6. The method of any of Aspects 1 to 5, wherein an end of the first slotted body rivet nut extends into the first bolt passage of the first spacer.

Aspect 7. The method of Aspect 6, wherein an outer diameter of the end of the first slotted body rivet nut is equal to or less than a diameter of the first bolt passage of the first spacer.

Aspect 8. The method of any of Aspects 1 to 7, wherein the flat wall panel is a first flat wall panel, the method further comprising: attaching a second slotted body rivet nut to the non-flat inner wall of the vehicle such that a longitudinal axis of the second slotted body rivet nut extends parallel to the floor of the vehicle; attaching a second spacer to the second slotted body rivet nut, wherein the second spacer has a second bolt passage formed therein, wherein a longitudinal axis of the second bolt passage is aligned with the longitudinal axis of the second slotted body rivet nut; aligning a second bolt hole formed in a second flat wall panel with the second bolt passage formed in the second spacer; inserting a second bolt through the second bolt hole of the second flat wall panel, through the second bolt passage of the second spacer, and into an end of the second slotted body rivet nut; and tightening the second bolt into the second slotted body rivet nut, wherein an edge of the first flat wall panel is adjacent an edge of the second flat wall panel to form a seam between the first flat wall panel and the second flat wall panel.

Aspect 9. The method of Aspect 8, further comprising: removing the first bolt from the first flat wall panel; removing the second bolt from the second flat wall panel; placing a flat trim panel over the seam; inserting the first bolt through the first bolt hole of the first flat wall panel, through the first bolt passage of the first spacer, and into the end of the first slotted body rivet nut; retightening the first bolt into the first slotted body rivet nut; inserting the second bolt through the second bolt hole of the second flat wall panel, through the second bolt passage of the second spacer, and into the end of the second slotted body rivet nut; and retightening the second bolt into the second slotted body rivet nut.

Aspect 10. The method of any of Aspects 1 to 9, wherein the first spacer has an annular shape.

Aspect 11. A method for creating a flat and installing a flat wall panel on a non-flat inner wall of a vehicle, the method comprising: determining a plane in the vehicle for placement of the flat wall panel; attaching a first slotted body rivet nut to the non-flat inner wall of the vehicle such that a longitudinal axis of the first slotted body rivet nut extends parallel to a floor of the vehicle; determining a Z-distance between an abutment surface of the first slotted body rivet nut and the plane; and attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut, wherein a length of the first spacer is equal to the Z-distance.

Aspect 12. The method of Aspect 11, further comprising: aligning a first bolt hole formed in the flat wall panel with the first bolt passage formed in the first spacer; inserting a first bolt through the first bolt hole of the flat wall panel, through the first bolt passage of the first spacer, and into an end of the first slotted body rivet nut; and tightening the first bolt into the first slotted body rivet nut.

Aspect 13. The method of Aspect 12, wherein the first spacer is attached to the abutment surface of the first slotted body rivet nut.

Aspect 14. The method of Aspect 12 or 13, wherein a length of the first bolt passage is equal to the Z-distance.

Aspect 15. The method of any of Aspects 12 to 14, wherein a length of the first bolt is equal to or greater than the Z-distance.

Aspect 16. The method of any of Aspects 12 to 15, wherein the flat wall panel is a first flat wall panel, the method further comprising: attaching a second slotted body rivet nut to the non-flat inner wall of the vehicle such that a longitudinal axis of the second slotted body rivet nut extends parallel to the floor of the vehicle; attaching a second spacer to the second slotted body rivet nut, wherein the second spacer has a second bolt passage formed therein, wherein a longitudinal axis of the second bolt passage is aligned with the longitudinal axis of the second slotted body rivet nut; aligning a second bolt hole formed in a second flat wall panel with the second bolt passage formed in the second spacer; inserting a second bolt through the second bolt hole of the second flat wall panel, through the second bolt passage of the second spacer, and into an end of the second slotted body rivet nut; and tightening the second bolt into the second slotted body rivet nut, wherein an edge of the first flat wall panel is adjacent an edge of the second flat wall panel to form a seam between the first flat wall panel and the second flat wall panel.

Aspect 17. The method of Aspect 16, further comprising: removing the first bolt from the first flat wall panel; removing the second bolt from the second flat wall panel; placing a flat trim panel over the seam; inserting the first bolt through the first bolt hole of the first flat wall panel, through the first bolt passage of the first spacer, and into the end of the first slotted body rivet nut; retightening the first bolt into the first slotted body rivet nut; inserting the second bolt through the second bolt hole of the second flat wall panel, through the second bolt passage of the second spacer, and into the end of the second slotted body rivet nut; and retightening the second bolt into the second slotted body rivet nut.

Aspect 18. The method of any of Aspects 11 to 17, wherein an end of the first slotted body rivet nut extends into the first bolt passage of the first spacer.

Aspect 19. The method of Aspect 18, wherein an outer diameter of the end of the first slotted body rivet nut is equal to or less than a diameter of the first bolt passage of the first spacer.

Aspect 20. The method of any of Aspects 11 to 19, wherein the first spacer has an annular shape.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

What is claimed is:

1. A method for installing a flat wall panel on a non-flat inner wall of a vehicle, the method comprising:
   determining a plane in the vehicle for placement of the flat wall panel;
   attaching a first slotted body rivet nut directly to the non-flat inner wall of the vehicle such that a longitudinal axis of the first slotted body rivet nut extends parallel to a floor of the vehicle;
   determining a Z-distance between an abutment surface of the first slotted body rivet nut and the plane;
   attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut, such that tightening the first bolt will longitudinally compress the spacer along the axis of the first bolt; and
   wherein a length of the first spacer is equal to the Z-distance.

2. The method of claim 1, further comprising:
   aligning a first bolt hole formed in the flat wall panel with the first bolt passage formed in the first spacer;
   inserting a first bolt through the first bolt hole of the flat wall panel, through the first bolt passage of the first spacer, and into an end of the first slotted body rivet nut; and
   tightening the first bolt into the first slotted body rivet nut to longitudinally compress the spacer along the axis of the first bolt.

3. The method of claim 2, wherein the first spacer is attached to the abutment surface of the first slotted body rivet nut.

4. The method of claim 2, wherein the flat wall panel is a first flat wall panel, the method further comprising:
   attaching a second slotted body rivet nut having an abutment surface directly to the non-flat inner wall of the vehicle such that a longitudinal axis of the second slotted body rivet nut extends parallel to the floor of the vehicle;
   attaching a second spacer to the abutment surface of second slotted body rivet nut, wherein the second spacer has a second bolt passage formed therein, wherein a longitudinal axis of the second bolt passage is aligned with the longitudinal axis of the second slotted body rivet nut, such that tightening the first bolt will longitudinally compress the spacer along the axis of the first bolt;
   aligning a second bolt hole formed in a second flat wall panel with the second bolt passage formed in the second spacer;
   inserting a second bolt through the second bolt hole of the second flat wall panel, through the second bolt passage of the second spacer, and into an end of the second slotted body rivet nut;
   tightening the second bolt into the second slotted body rivet nut, to longitudinally compress the second spacer along the axis of the second bolt; and
   wherein an edge of the first flat wall panel is adjacent an edge of the second flat wall panel to form a seam between the first flat wall panel and the second flat wall panel.

5. The method of claim 1, wherein the first spacer has an annular shape.

6. A method for installing a flat wall panel on a non-flat inner wall of a vehicle, the method comprising:
   determining a plane in the vehicle for placement of the flat wall panel;
   attaching a first slotted body rivet nut to the non-flat inner wall of the vehicle such that a longitudinal axis of the first slotted body rivet nut extends parallel to a floor of the vehicle;
   determining a Z-distance between an abutment surface of the first slotted body rivet nut and the plane;
   attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut, wherein a length of the first spacer is equal to the Z-distance;
   aligning a first bolt hole formed in the flat wall panel with the first bolt passage formed in the first spacer;
   inserting a first bolt through the first bolt hole of the flat wall panel, through the first bolt passage of the first spacer, and into an end of the first slotted body rivet nut;
   tightening the first bolt into the first slotted body rivet nut; and
   wherein a length of the first bolt passage is equal to the Z-distance.

7. A method for installing a flat wall panel on a non-flat inner wall of a vehicle, the method comprising:
   determining a plane in the vehicle for placement of the flat wall panel;
   attaching a first slotted body rivet nut to the non-flat inner wall of the vehicle such that a longitudinal axis of the first slotted body rivet nut extends parallel to a floor of the vehicle;
   determining a Z-distance between an abutment surface of the first slotted body rivet nut and the plane;
   attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut, wherein a length of the first spacer is equal to the Z-distance;
   aligning a first bolt hole formed in the flat wall panel with the first bolt passage formed in the first spacer;
   inserting a first bolt through the first bolt hole of the flat wall panel, through the first bolt passage of the first spacer, and into an end of the first slotted body rivet nut;
   tightening the first bolt into the first slotted body rivet nut; and
   wherein a length of the first bolt is equal to or greater than the Z-distance.

8. A method for installing a flat wall panel on a non-flat inner wall of a vehicle, the method comprising:
   determining a plane in the vehicle for placement of the flat wall panel;
   attaching a first slotted body rivet nut to the non-flat inner wall of the vehicle such that a longitudinal axis of the first slotted body rivet nut extends parallel to a floor of the vehicle;

determining a Z-distance between an abutment surface of the first slotted body rivet nut and the plane;

attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut, wherein a length of the first spacer is equal to the Z-distance;

aligning a first bolt hole formed in the flat wall panel with the first bolt passage formed in the first spacer;

inserting a first bolt through the first bolt hole of the flat wall panel, through the first bolt passage of the first spacer, and into an end of the first slotted body rivet nut;

tightening the first bolt into the first slotted body rivet nut;

wherein the flat wall panel is a first flat wall panel, the method further comprising:

attaching a second slotted body rivet nut to the non-flat inner wall of the vehicle such that a longitudinal axis of the second slotted body rivet nut extends parallel to the floor of the vehicle;

attaching a second spacer to the second slotted body rivet nut, wherein the second spacer has a second bolt passage formed therein, wherein a longitudinal axis of the second bolt passage is aligned with the longitudinal axis of the second slotted body rivet nut;

aligning a second bolt hole formed in a second flat wall panel with the second bolt passage formed in the second spacer;

inserting a second bolt through the second bolt hole of the second flat wall panel, through the second bolt passage of the second spacer, and into an end of the second slotted body rivet nut;

tightening the second bolt into the second slotted body rivet nut;

wherein an edge of the first flat wall panel is adjacent an edge of the second flat wall panel to form a seam between the first flat wall panel and the second flat wall panel, the method further comprising:

removing the first bolt from the first flat wall panel;

removing the second bolt from the second flat wall panel;

placing a flat trim panel over the seam;

inserting the first bolt through the first bolt hole of the first flat wall panel, through the first bolt passage of the first spacer, and into the end of the first slotted body rivet nut;

retightening the first bolt into the first slotted body rivet nut;

inserting the second bolt through the second bolt hole of the second flat wall panel, through the second bolt passage of the second spacer, and into the end of the second slotted body rivet nut; and retightening the second bolt into the second slotted body rivet nut.

9. A method for installing a flat wall panel on a non-flat inner wall of a vehicle, the method comprising:

determining a plane in the vehicle for placement of the flat wall panel;

attaching a first slotted body rivet nut to the non-flat inner wall of the vehicle such that a longitudinal axis of the first slotted body rivet nut extends parallel to a floor of the vehicle;

determining a Z-distance between an abutment surface of the first slotted body rivet nut and the plane;

attaching a first spacer to the abutment surface of the first slotted body rivet nut, wherein the first spacer has a first bolt passage formed therein, wherein a longitudinal axis of the first bolt passage is aligned with the longitudinal axis of the first slotted body rivet nut;

wherein a length of the first spacer is equal to the Z-distance; and wherein an end of the first slotted body rivet nut extends into the first bolt passage of the first spacer.

10. The method of claim 9, wherein an outer diameter of the end of the first slotted body rivet nut is equal to or less than a diameter of the first bolt passage of the first spacer.

* * * * *